J. C. S. HERMISTONE.
PIPE CUTTER.
APPLICATION FILED AUG. 26, 1920.
1,376,936.
Patented May 3, 1921.
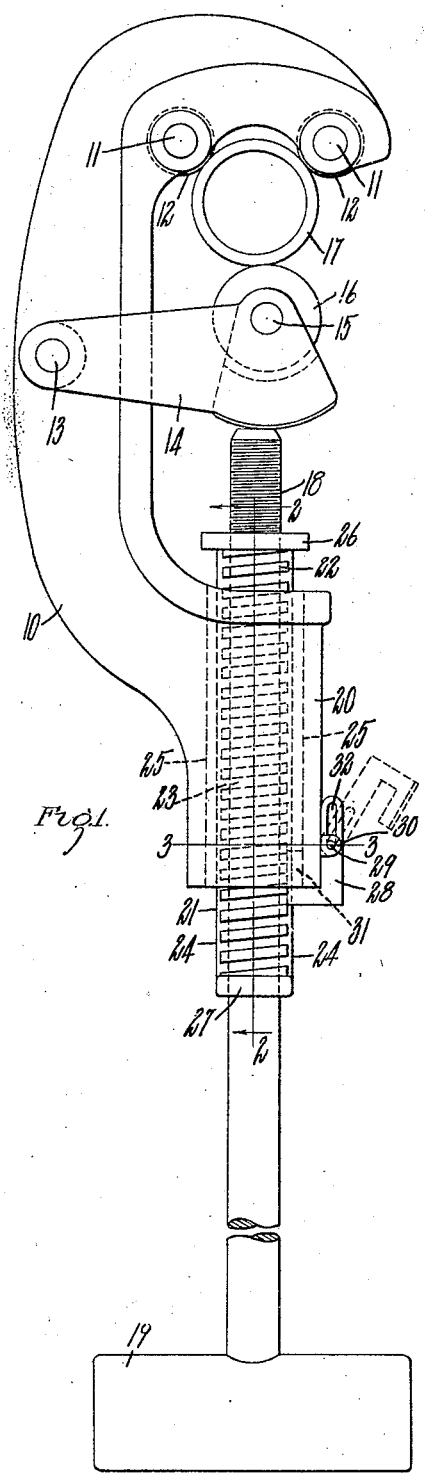
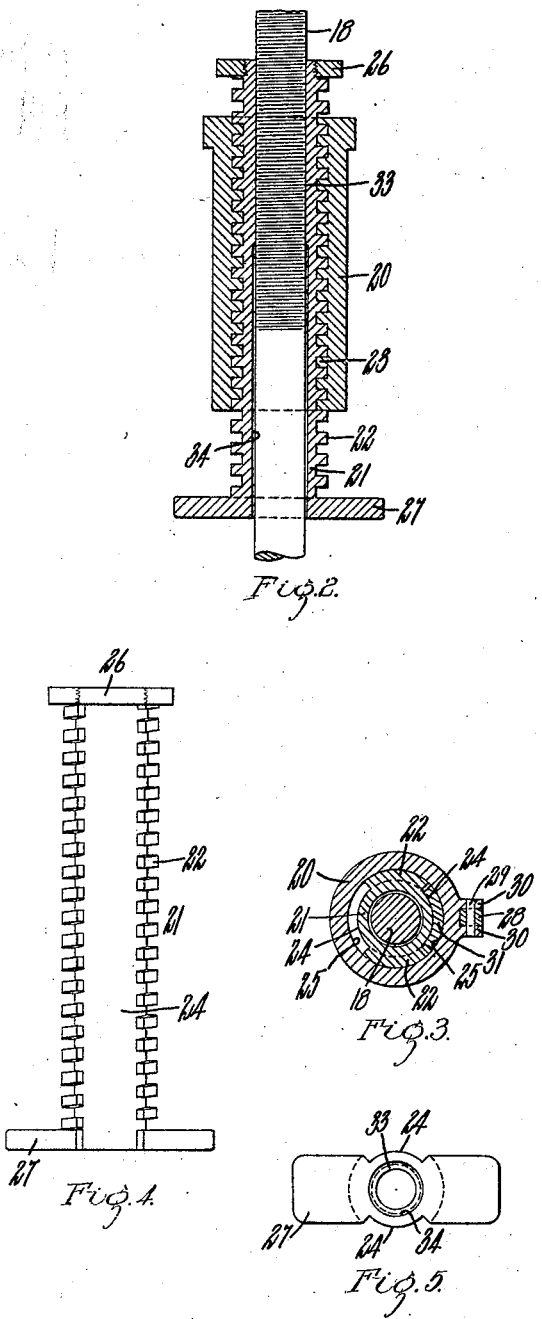
Inventor:
John C. S. Hermistone.
by his attorney

UNITED STATES PATENT OFFICE.

JOHN C. S. HERMISTONE, OF BOSTON, MASSACHUSETTS.

PIPE-CUTTER.

1,376,936.  Specification of Letters Patent.  Patented May 3, 1921.

Application filed August 26, 1920. Serial No. 406,194.

*To all whom it may concern:*

Be it known that I, JOHN C. S. HERMISTONE, a citizen of the United States, residing at Boston, in the county of Suffolk and State of Massachusetts, have invented new and useful Improvements in Pipe-Cutters, of which the following is a specification.

This invention relates to an improvement in pipe cutters.

The object of the invention is to so construct a pipe cutter that the cutting wheel thereof may be quickly adjusted in order that the device may be applied to widely varying sizes of pipes or quickly disengaged therefrom after the cutting operation has been completed without being obliged to turn the usual screw a multiplicity of revolutions.

The invention consists in the combination and arrangement of parts set forth in the following specification and particularly pointed out in the claims thereof.

Referring to the drawings:

Figure 1 is a side elevation of a pipe cutter embodying my invention.

Fig. 2 is a detail longitudinal section taken on the line 2—2 of Fig. 1.

Fig. 3 is a detail transverse section taken on the line 3—3 of Fig. 1.

Fig. 4 is a front elevation of the screw-threaded sleeve as viewed from either the right or left of Fig. 1.

Fig. 5 is an end elevation of the screw-threaded sleeve as viewed from the lower end of Fig. 4.

Like numerals refer to like parts throughout the several views of the drawings.

In the drawings, 10 represents a frame, at one end of which are mounted upon a pair of studs 11 a pair of rollers 12. Pivoted at 13 to the frame is a member 14 upon which is mounted upon a stud 15 a cutting wheel 16. The cutting wheel 16 is forced against a pipe 17 which, in turn, is forced against the rollers 12 by a screw 18, upon the outer end of which is a handle 19. The before mentioned parts are all old and well known in this art, the present invention residing in a novel construction provided for eliminating an unnecessary amount of turning of the screw 18 when a wide adjustment is necessary.

Mounted in a boss 20 forming a portion of the frame 10 is a sleeve 21 preferably provided with a square type screw thread 22 adapted to engage a similar screw thread 23 provided in the boss 20. The screw threads 22 are interrupted upon opposite sides of the sleeve 21 by providing grooves 24 extending longitudinally of said sleeve and the screw threads 23 are likewise interrupted upon opposite sides thereof by providing grooves 25 extending longitudinally through the boss 20. The width of the grooves 25 is sufficient to allow the sleeve 21 to be given a one quarter rotation from its normal locked position, to a position where the screw threads 22 and 23 are disengaged from each other after which said sleeve may be moved longitudinally within the boss 20 the distance required, whereupon said sleeve may again be rotated to again bring the screw threads into engagement.

The longitudinal movement of the sleeve 21 within the boss 20 away from the cutting instrumentalities is limited by a collar 26 which has screw-threaded engagement with one end of said sleeve, the said collar contacting with the frame 10, and the opposite end of said sleeve has a handle 27 formed integral therewith which will also contact with said frame, thereby limiting the movement of said sleeve toward said cutting instrumentalities and also providing a convenient place to grasp said sleeve when it is desired to turn the same.

The sleeve 21 is locked against rotation within the boss 20 by a locking member 28 which is pivotally attached by a pin 29 between a pair of lugs 30 formed integral with the frame 10, said locking member having a key portion 31 formed integral therewith which is adapted to be inserted within one of the grooves 25 and the groove 24 which alines therewith when the screw thread 22 of the sleeve 21 is in engagement with the screw thread 23 of the boss 20. The locking member 28 is provided with a slot 32 thereby allowing said locking member to slide upon the pin 29, whereupon the key portion 31 may be inserted within the end of the alining grooves.

The screw 18 extends longitudinally through the sleeve 21 upon the median axial line thereof and has screw-threaded engagement with said sleeve at 33. The screw threads are eliminated from a portion of the interior of the sleeve at 34, thereby eliminating the necessity of turning the screw 18 the entire length of said sleeve when inserting or removing said screw from said sleeve.

The general operation of my improved pipe cutter is as follows: Assuming that the member 14 with a cutting wheel 16 mounted thereon is located in a position where the pipe cutter could only be applied to a very small pipe without making adjustments and it is desired to apply the pipe cutter to a relatively larger pipe the locking member 28 is slid longitudinally upon the boss 20 until the key portion 31 of said locking member is removed from the end of the alining grooves 24 and 25 and the locking member 28 is then swung to a position approximately as indicated in dotted lines in Fig. 1. The handle 27 of the sleeve 21 is then grasped and said sleeve is rotated through an angle of 90° until the screw threads 22 of said sleeve are disengaged from the screw threads 23 of the boss 20, at which time the screw threads 22 will be in alinement with the grooves 25 of the boss 20 and the screw threads 23 of said boss will be in alinement with the grooves 24 of said sleeve. The sleeve 21 is then moved longitudinally within the boss 20 away from the member 14 thereby allowing said member 14 to rock upon its pivot 13 and increase the space between the cutting wheel 16 and the rollers 12 a sufficient distance for the device to be applied to the desired pipe. The sleeve 12 is then again rotated through an angle of 90° to again bring the screw threads 22 and 23 into engagement and alinement with each other and to again aline the respective grooves 24 and 25, after which the key portion 31 of the locking member 28 is again inserted within said grooves thereby again locking said sleeve. The handle 19 of the screw 18 is then rotated in the proper direction to engage the member 14 and force the cutting wheel 16 against the pipe 17, after which the device is used in the well-known manner to sever the pipe 17, the screw 18 being turned as required to force the cutting wheel 16 into the pipe 17 as said pipe is severed. Where a wide adjustment is necessary much time may be saved and an unnecessary turning of the screw 18 eliminated by adjusting the device as hereinbefore mentioned. Where, however, only a small adjustment is required, the same may be accomplished by simply turning the screw 18 in the proper direction.

I claim:

1. A pipe cutter having, in combination, a frame, pipe cutting instrumentalities mounted upon said frame, a sleeve having screw-threaded engagement with said frame, means to prevent the rotation of said sleeve and thereby lock said sleeve to prevent a longitudinal movement thereof in either direction in the different positions occupied thereby within said frame and a screw extending through said sleeve adapted to force said cutting instrumentalities into engagement with said pipe.

2. A pipe cutter having, in combination, a frame, pipe cutting instrumentalities mounted upon said frame, a sleeve having screw-threaded engagement with said frame and embodying therein means located at the opposite ends thereof to prevent the removal thereof from said frame, means to prevent the rotation of said sleeve and thereby lock said sleeve to prevent a longitudinal movement thereof in either direction in the different positions occupied thereby within said frame and means extending through said sleeve adapted to force said cutting instrumentalities into engagement with said pipe.

3. A pipe cutter having, in combination, a frame, pipe cutting instrumentalities mounted upon said frame, a sleeve having screw-threaded engagement with said frame and provided with grooves extending longitudinally upon opposite sides thereof thereby interrupting said screw threads, the screw threads of said frame also being interrupted by grooves on opposite sides thereof whereby the screw threads of said sleeve may be disengaged from the screw threads of said frame and said sleeve moved longitudinally within said frame, means to lock said sleeve against rotation within said frame when said screw threads are in engagement and said grooves are in alinement with each other and means extending through said sleeve adapted to force said cutting instrumentalities into engagement with said pipe.

4. A pipe cutter having, in combination, a frame, pipe cutting instrumentalities mounted upon said frame, a sleeve having screw-threaded engagement with said frame and provided with grooves extending longitudinally upon opposite sides thereof, thereby interrupting said screw threads, the screw threads of said frame also being interrupted by grooves on opposite sides thereof whereby the screw threads of said sleeve may be disengaged from the screw threads of said frame and said sleeve moved longitudinally within said frame, means embodied in said sleeve adapted to limit the longitudinal movement of said sleeve within said frame and prevent the removal thereof from said frame, means to lock said sleeve against rotation within said frame when said screw threads are in engagement and said grooves are in alinement with each other and a screw extending through said sleeve adapted to force said cutting instrumentalities into engagement with said pipe.

5. A pipe cutter having, in combination, a frame, pipe cutting instrumentalities mounted upon said frame, a sleeve having screw-threaded engagement with said frame and provided with grooves extending longitudinally upon opposite sides thereof, thereby interrupting said screw threads, the screw threads of said frame also being interrupted by grooves on opposite sides thereof whereby the screw threads of said sleeve may be disengaged from the screw threads of said frame and said sleeve moved longitudinally within said frame, means embodied in said sleeve adapted to limit the longitudinal movement of said sleeve within said frame and prevent the removal thereof from said frame, a locking member attached to said frame and adapted to be inserted within one of the grooves of said sleeve and the groove of said frame alining therewith and thereby lock said sleeve against rotation within said frame and a screw extending through said sleeve adapted to force said cutting instrumentalities into engagement with said pipe.

In testimony whereof I have hereunto set my hand in presence of two subscribing witnesses.

JOHN C. S. HERMISTONE.

Witnesses:
FRANKLIN E. LOW,
CATHERINE M. JOYCE.